2 Sheets—Sheet 1.

C. H. MILLER.

STOVE OR RANGE DOOR OPENING AND CLOSING MECHANISM.

No. 11,174. Reissued July 7, 1891.

Witnesses
A. L. Jackson
G. J. Mead

Inventor
Charles H. Miller
By H. Sturgiss
Atty.

THE NORRIS PETERS CO., PHOTO-LITHO., WASHINGTON, D. C.

2 Sheets—Sheet 2.

C. H. MILLER.

STOVE OR RANGE DOOR OPENING AND CLOSING MECHANISM.

No. 11,174. Reissued July 7, 1891.

Witnesses.
A. L. Jackson
G. J. Mead

Inventor.
Charles H. Miller
By A. Sherman
Atty.

THE NORRIS PETERS CO., PHOTO-LITHO., WASHINGTON, D. C.

UNITED STATES PATENT OFFICE.

CHARLES H. MILLER, OF ERIE, PENNSYLVANIA.

STOVE OR RANGE DOOR OPENING AND CLOSING MECHANISM.

SPECIFICATION forming part of Reissued Letters Patent No. 11,174, dated July 7, 1891.

Original No. 440,848, dated November 18, 1890. Application for reissue filed February 28, 1891. Serial No. 383,495.

*To all whom it may concern:*

Be it known that I, CHARLES H. MILLER, a citizen of the United States, residing at the city of Erie, in the county of Erie and State of Pennsylvania, have invented certain new and useful Improvements in Stove or Range Door Opening and Closing Mechanism; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in stove or range door opening and closing mechanisms hereinafter set forth and explained, and illustrated in the accompanying drawings, in which—

Figure 1:
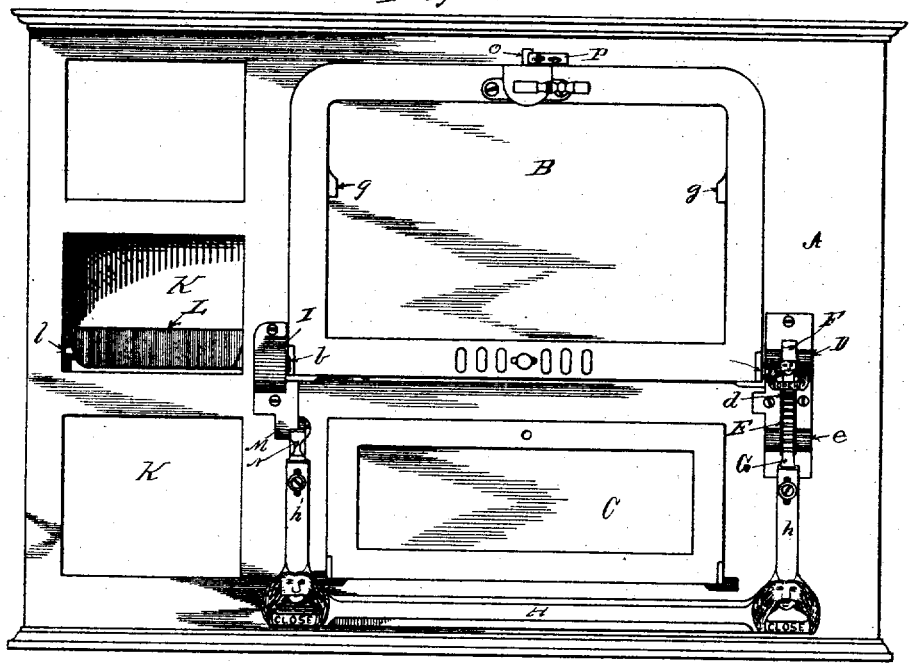
Figure 2:
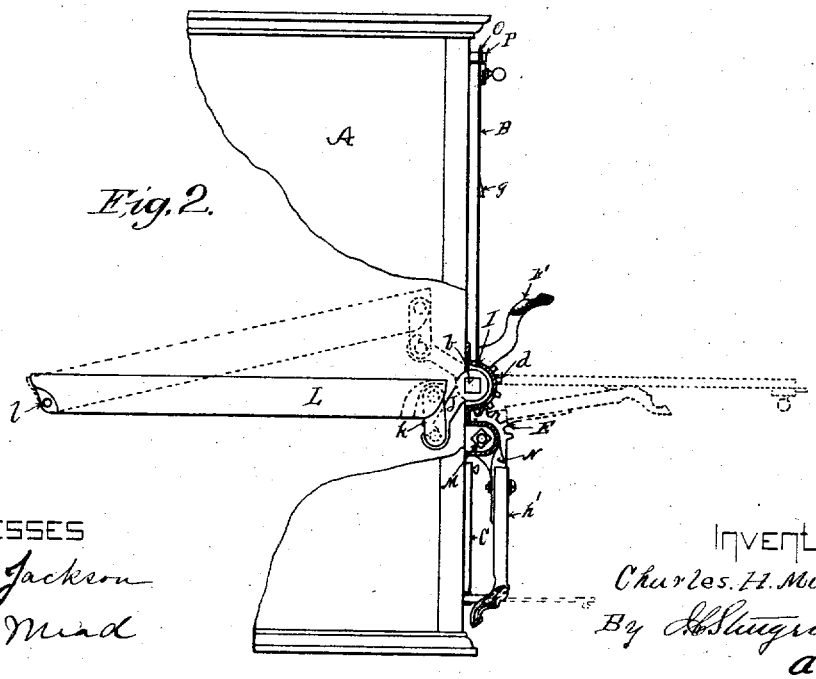
Figure 3:
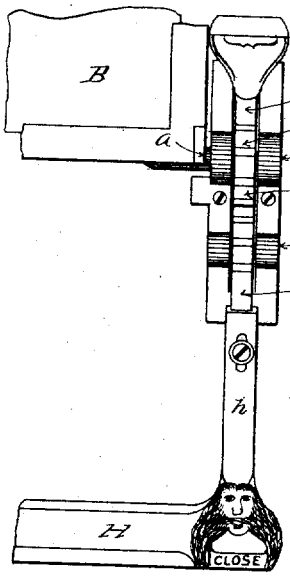
Figure 4:
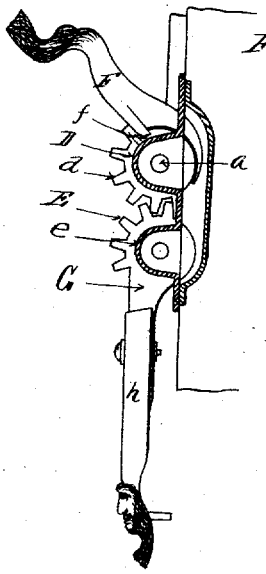
Figure 5:
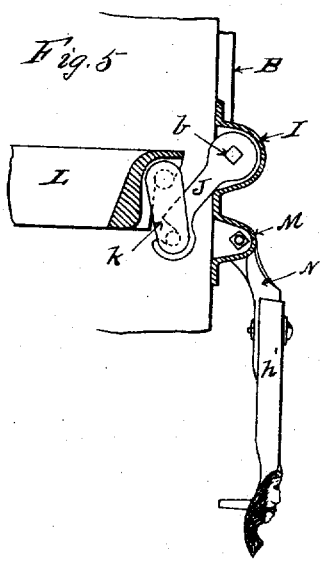
Figure 6:
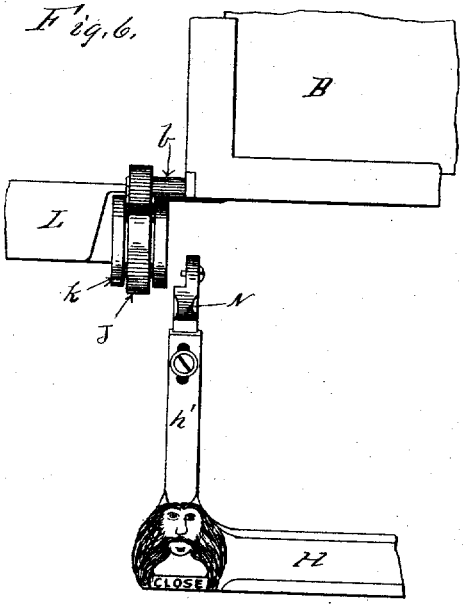

Figure 1 is a front elevation of a range embodying my invention. Fig. 2 is an end elevation of a section of same, showing the operation of my improved door opening and closing mechanism. Figs. 3, 4, 5, and 6 are detail views of parts of my improved door opening and closing mechanism.

Like letters refer to like parts in all the figures.

In the construction shown of my improved stove or range door opening and closing mechanism, A is a range, and B the oven-door and C the warming-oven door thereof, both of which are hinged at their lower corners to the range A, so as to open outward and downward. One of the pintles *a* of the door B passes into the bearing D and has secured thereon a segment *d* of spur-gear, which intermeshes with a segment E of spur-gear having an arm G thereon and mounted in bearings *e* below the bearing D.

Mounted on the pintle *a* so as to partially cover the spur-gear *d* is a lever F, adapted to engage with a catch *f* on the spur-gear *d* when being depressed and rotate the spur-gear *d*, secured to the pintle *a*, which operation also actuates the spur-gear E, intermeshing therewith. The arm G on the spur-gear E is also adapted to receive one end *h* of a foot-rail H, adjustably secured thereto, as and for the purposes hereinafter set forth. The other pintle *b* of the door B passes through a bearing I and is provided with a crank J, which extends through an opening into the ash-vault K of the range, where it is coupled by means of a link *k* to a heavy cast-iron ash-chute L. This ash-chute L is hinged at its rear end to the range by means of pintles *l*, while the outer or front end rests entirely upon the link *k* and crank J, secured to the pintle *b*, so that the opening of the door B, as shown by dotted lines in Fig. 2, serves to raise the outer end of the weighted ash-chute L, which operates to counterbalance the weight of the door B.

Below the bearing I and in line with the bearing *e* at the opposite side of the door B is a bearing M, in which is mounted a short arm N, adapted to receive the opposite end *h'* of the foot-rail H, adjustably secured thereto, so that the foot-rail H swings freely up and down, as particularly illustrated by dotted lines in Fig. 2, the gearing *d* E serving to operate the foot-rail H in unison with the movement of the door B, the foot-rail H operating, if desired, as a partial counter-balance for the door B. The foot-rail H also operates as a brace for the door B, engaging with lugs or stops *g* *g* thereon when the door B is completely opened, as shown in dotted lines in Fig. 2.

For closing the door B the operator presses down upon the lever G, when used without a foot-rail, or upon the foot-rail H, secured thereto, which operates through the gears E *d* to raise the door B upward and close it. In opening the door B it is only necessary to depress the lever F, which operates to throw the door B open.

The latch O on the door B is an ordinary gravity-latch adapted to engage with a catch P, which I preferably make adjustable, so that the catch P can be adjusted so that the latch O can be disengaged therefrom by pressure upon the lever F, so that in opening and closing the door B the same will operate automatically.

When the door B is closed, the foot-rail H rests against the lower part of the range A, and when the warming-oven door C is opened it operates as a support therefor, as illustrated in dotted lines in Fig. 2.

Having thus fully described my invention, what I claim as new, and desire to secure by Letters Patent of the United States, is—

1. The combination, in a stove or range door opening and closing mechanism, of a door opening downward and outward, with a weighted ash-chute hinged at its inner end to a stove or range and coupled at its outer end by means of a link to a crank on one of the pintles of said door, substantially as and for the purpose set forth.

2. The combination, in a stove or range door opening and closing mechanism, of a counterbalanced door opening downward and outward, a segment of spur-gear on one of the pintles of said door, and a door-opening lever adapted to engage said spur-gear for opening the door, with a door-closing lever mounted in bearings adjacent to the door-pintle bearing, and a segment of spur-gear on said door-closing lever intermeshing with the segment of spur-gear on the door-pintle, substantially as and for the purpose set forth.

3. The combination, in a stove or range door opening and closing mechanism, of a counterbalanced door opening downward and outward, a spur-gear on one of the pintles of said door, and a door-opening lever adapted to engage said spur-gear when operated to open said door, with an adjustable foot-rail mounted in bearings adjacent to the bearings of the door-pintles, and a spur-gear on one of the bearings of said foot-rail intermeshing with the spur-gear on the door-pintle, substantially as and for the purpose set forth.

4. The combination, in a stove or range door opening and closing mechanism, of a door opening downward and outward, and a hinged counter-balance coupled to a crank on one of the pintles of said door, with a spur-gear on one of the pintles of said door, a door-opening lever engaging said spur-gear, a foot-rail hinged in bearings under the door-pintle bearings, and a spur-gear on one of the foot-rail bearings intermeshing with the spur-gear on the door-pintle, whereby the door and foot-rail move in unison, substantially as and for the purpose set forth.

5. The combination, in a stove or range, of a door B, opening downward and outward, with a foot-rail H geared to said door B by means of a spur-gear E thereon intermeshing with a spur-gear *d* on the pintle of the door B, so that the opening of the door moves the foot-rail H upward in unison therewith as the door is being opened until when the door is fully opened it engages with lugs *g* thereon and operates as a supporting-brace for said door, substantially as and for the purpose set forth.

In testimony whereof I affix my signature in the presence of two witnesses.

CHARLES H. MILLER.

Witnesses:

H. C. CROWELL,

F. J. BASSETT.